US009881375B2

(12) United States Patent
Gordon et al.

(10) Patent No.: US 9,881,375 B2
(45) Date of Patent: Jan. 30, 2018

(54) MARKERS IN 3D DATA CAPTURE

(71) Applicants: Eyal Gordon, Haifa (IL); Michael Slutsky, Kfar Saba (IL); Yonatan Samet, Givataim (IL)

(72) Inventors: Eyal Gordon, Haifa (IL); Michael Slutsky, Kfar Saba (IL); Yonatan Samet, Givataim (IL)

(73) Assignee: MANTIS VISION LTD., Petach Tikua (IL)

( * ) Notice: Subject to any disclaimer, the term of this patent is extended or adjusted under 35 U.S.C. 154(b) by 0 days.

(21) Appl. No.: 14/749,432

(22) Filed: Jun. 24, 2015

(65) Prior Publication Data

US 2016/0163031 A1 Jun. 9, 2016

Related U.S. Application Data

(60) Provisional application No. 62/087,845, filed on Dec. 5, 2014.

(51) Int. Cl.
*G06K 9/00* (2006.01)
*G06T 7/00* (2017.01)
(Continued)

(52) U.S. Cl.
CPC ............. *G06T 7/002* (2013.01); *G06K 9/209* (2013.01); *G06K 9/2036* (2013.01); *G06K 9/3216* (2013.01); *G06T 7/521* (2017.01); *G06T 7/536* (2017.01); *G06T 7/80* (2017.01); *G06T 7/85* (2017.01); *G06T 15/205* (2013.01); (Continued)

(58) Field of Classification Search
CPC .. G06T 7/80; G06T 7/85; G06T 7/536; G06T 7/521; G06T 2200/04; G06T 15/205; G06T 2207/10021; G06T 2207/20228; G06T 2207/30204; G06K 9/2036; G06K 9/209; G06K 9/3216; H04N 13/0246; H04N 5/2224

See application file for complete search history.

(56) References Cited

U.S. PATENT DOCUMENTS

| | | | |
|---|---|---|---|
| 8,090,194 B2* | 1/2012 | Golrdon | G01B 11/2513 382/154 |
| 2010/0074532 A1* | 3/2010 | Gordon | G01B 11/25 382/203 |
| 2015/0339503 A1* | 11/2015 | Slutsky | G06K 7/10732 235/462.06 |

OTHER PUBLICATIONS

Audet, Samuel, and Masatoshi Okutomi. "A user-friendly method to geometrically calibrate projector-camera systems." 2009 IEEE Computer Society Conference on Computer Vision and Pattern Recognition Workshops. IEEE, 2009.*

* cited by examiner

*Primary Examiner* — Shefali Goradia
(74) *Attorney, Agent, or Firm* — Vladimir Sherman; Professional Patent Solutions

(57) ABSTRACT

A structured light projector includes an optical mask and a light emitter. The light emitter can be capable of illuminating the optical mask, and the optical mask can be capable of transforming the light from the emitter so as to provide structured light bi-dimensional coded light pattern that includes a plurality of feature types formed by a unique combination of feature elements. The projected light pattern includes one or more markers which include pairs of feature elements between which the epipolar distances are modified relative to distances between respective feature elements in non-marker areas of the pattern, and an appearance of feature elements within the marker and across the marker's edges is continuous.

29 Claims, 7 Drawing Sheets

(51) Int. Cl.
*G06K 9/20* (2006.01)
*G06K 9/32* (2006.01)
*G06T 15/20* (2011.01)
*H04N 5/222* (2006.01)
*H04N 13/02* (2006.01)
*G06T 7/80* (2017.01)
*G06T 7/521* (2017.01)
*G06T 7/536* (2017.01)

(52) U.S. Cl.
CPC ....... *H04N 5/2224* (2013.01); *H04N 13/0246* (2013.01); *G06T 2200/04* (2013.01); *G06T 2207/10021* (2013.01); *G06T 2207/20228* (2013.01); *G06T 2207/30204* (2013.01)

MARKERS IN 3D DATA CAPTURE

RELATED APPLICATION

This application claims priority to U.S. Provisional Application Ser. No. 62/087,845 (entitled MARKERS IN 3D DATA CAPTURE, filed Dec. 5, 2014) which is incorporated herein by reference.

TECHNICAL FIELD

The present disclosure, in some examples thereof, relates to a bi-dimensional structured light pattern and using markers in such codes.

BACKGROUND

Some 3D data, imaging and video capture techniques use light projection to capture 3D data. The projected light can be encoded using a structured light pattern, and in particular a bi-dimensional coded light pattern. The projected bi-dimensional coded light pattern can reflect off surfaces and can be detected and captured with a camera or sensor. Decoding procedures are then used to detect the projected light patterns, and by comparison to its deformation, 3D data can be determined. For convenience the term 3D imaging is used herein to refer to any one of the following: 3D data capture techniques, 3D imaging capture techniques and 3D video capture technique.

Some structured light patterns contain code words embedded into the structured light pattern which create feature types. Each code word is comprised of code word elements, or bits. Each feature type is comprised of feature elements. Each feature element is given a certain visual appearance such as light intensities, shapes and pixels, and different feature types are characterized by different formations of feature elements.

SUMMARY

According to an aspect of the presently disclosed subject matter, there is provided an apparatus including a memory storing an image of a reflection off a scene of a projected structured light bi-dimensional coded light pattern that includes a plurality of feature types, each one of the plurality feature types serves as a codeword and is formed by a unique combination of feature elements, and wherein the projected light pattern includes one or more markers. A marker includes one or more pairs of feature elements between which the epipolar distances are modified relative to distances between respective feature elements in non-marker areas of said pattern. The apparatus also includes a processor. The processor is capable of detecting a marker in the image and is configured to record the detected marker's location. The processor is further configured to decode the image, where at least one feature type within the marker is classified by the processor as a feature type from said plurality of feature types.

According to a further aspect of the presently disclosed subject matter there is provided a structured light projector. The structured light projector includes an optical mask and a light emitter. According to examples of the presently disclosed subject matter, the light emitter can be capable of illuminating the optical mask. The optical mask is capable of transforming the light from the emitter so as to provide structured light bi-dimensional coded light pattern that includes a plurality of feature types. Each one of the plurality feature types serves as a codeword and is formed by a unique combination of feature elements. The projected light pattern includes one or more markers, where a marker includes one or more pairs of feature elements between which the epipolar distances are modified relative to distances between respective feature elements in non-marker areas of said pattern. The wherein appearance of feature elements within the marker and across the marker's edges is continuous.

In yet another aspect of the presently disclosed subject matter there is provided a method, comprising: obtaining an image of a reflection off a scene of a projected structured light bi-dimensional coded light pattern that includes a plurality of feature types, each one of the plurality feature types serves as a codeword and is formed by a unique combination of feature elements, wherein the projected light pattern includes one or more markers, and wherein a marker includes one or more pairs of feature elements between which the epipolar distances are modified relative to distances between respective feature elements in non-marker areas of said pattern; detecting a marker in said image and recording the detected marker's location; decoding said image, wherein at least one feature type within the marker is classified as a feature type from said plurality of feature types.

In yet another aspect of the presently disclosed subject matter there is provided a method of generating a structured light code. According to examples of the presently disclosed subject matter, the method of generating a structured light code can include: obtaining a structured light bi-dimensional coded light pattern that includes a plurality of feature types, each one of the plurality feature types servers as a codeword and is formed by a unique combination of feature elements; selecting one or more distortion areas; and modifying epipolar distances between one or more pairs of feature elements within distortion areas giving rise to one or more markers, where a marker is an area in which the epipolar distances between pairs of feature elements are modified relative to distances between respective feature elements in non-marker areas of said pattern.

BRIEF DESCRIPTION OF THE DRAWINGS

In order to understand the invention and to see how it may be carried out in practice, certain embodiments of the invention will now be described, by way of non-limiting example only, with reference to the accompanying drawings, in which.

Figure 1:
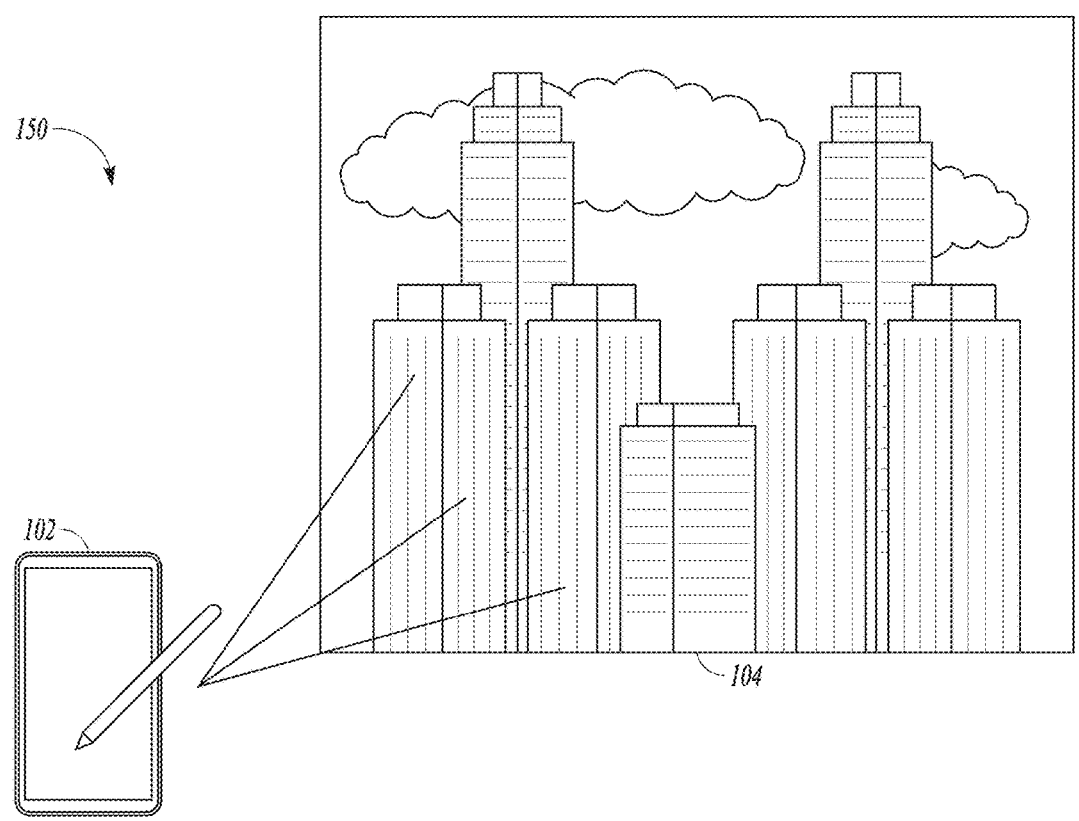
FIG. 1 is a block representation of a 3D system according to an example of the present disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

GENERAL DESCRIPTION

In the following general description, numerous specific details are set forth in order to provide a thorough understanding of the presently disclosed subject matter. However, it will be understood by those skilled in the art that the presently disclosed subject matter may be practiced without these specific details. In other instances, well-known features, structures, characteristics, stages, methods, procedures, modules, components and systems, have not been described in detail so as not to obscure the presently disclosed subject matter.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "obtaining", "modifying", "shifting", "detecting", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, or a part thereof.

The term computer should be expansively construed to cover any kind of electronic device or system with data processing capabilities and which is made up of any combination of hardware, software and/or firmware and which includes at least some hardware, even if not labeled as such in the disclosure.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein the term "memory" refers to any readable medium for storing data for the short and/or long term, locally and/or remotely. Examples of memory include inter-alia: any type of disk including floppy disk, hard disk, optical disk, CD-ROMs, magnetic-optical disk, magnetic tape, flash memory, random access memory (RAMs), dynamic random access memory (DRAM), static random access memory (SRAM), read-only memory (ROMs), programmable read only memory PROM, electrically programmable read-only memory (EPROMs), electrically erasable and programmable read only memory (EEPROMs), magnetic card, optical card, any other type of media suitable for storing electronic instructions and capable of being coupled to a system bus, a combination of any of the above, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Furthermore, it is appreciated that certain features of the invention, which are, described in the context of different embodiments, may also be provided in combination in a single embodiment. Conversely, various features of the invention, which are, for brevity, described in the context of a single embodiment, may also be provided separately or in any suitable sub-combination.

FIG. 1 illustrates a system 150 for capturing 3D data according to some examples of the presently disclosed subject matter. Various examples of the system may be implemented in hardware or software. A 3D capture device 102 can be an active triangulation 3D capture device and can include a projector or a scanner for projecting a signal onto a scene and a sensor for detecting a reflected signal corresponding to the projected signal. The projected signal can be provided in a form of a bi-dimensional pattern.

The 3D capture device 102 may be a 3D camera or a 3D video camera, and may be designed as a standalone device or can be integrated into a mobile communication device, such as a smartphone or a tablet. In another example, the 3D capture device is integrated or is operatively connector to a PC, a cloud computing platform or any other suitable computerized device. 3D capture device 102 may include one or more metadata sensors to provide information regarding the captured 2D or 3D data for a sight such as scene 104. 2D or 3D data is also referred to herein as video or images. The metadata may be generated or supplemented by other device(s) or other users. The metadata which is captured by the capturing device and/or other devices may include, for example, exposure time, pattern data, marker point data, aperture size, Infrared (IR) wavelength, chroma or intensities used or received, orientation and calibration data, etc. Metadata sensors may include, for example, accelerometers, Charge Coupled Devices (CCD's), gyroscopic sensors, IR sensors and Geographical Positioning System (GPS) units.

Capture device 102 may be complemented by additional capturing or processing devices in other examples. For example, one 3D capture device may be used with one or more other 3D capture devices such as multiple separate 3D cameras. Similarly additional imaging or processing devices may be used such as a laptop for processing and/or capturing data. A laptop or server may be used connected locally through a Bluetooth, Wi-Fi, NFC or other close proximity connection in order to help process the data or remotely through telecommunications network such as Fourth Generation (4G) Wireless network, etc.

Image scene 104 may be any kind of stationary or dynamic scenery with one or more objects. The image scene 104 may be one object with a fixed background such as a light room. The image scene may also be a dynamically changing indoor or outdoor environment such as a city or video of humans interacting. In image capturing, the capturing device may be fixed or handheld and rotated around an object to gather 3D data.

3D Capture device 102 may project a coded structured light pattern onto the image scene 104. The structured light pattern may be a bi-dimensional coded structured light pattern. The projected structured light pattern may be bi-tonal. The capturing device may then capture the scene with the projected pattern which may be deformed (or shifted) by the 3D topography of the scene. An image of a reflection of the projected pattern can be processed and used to determine, by comparison to the original pattern, depth information including for example, 3D measurements of objects in the scene, topology of the scene and/or one or more point clouds or range images which correspond to the depth of the scene. The capturing device 102 may be calibrated and can be configured to register 3D data from multiple frames and/or devices. Further by way of example, the calibration of the capturing device and/or the registration of 3D data from frames generated by the capturing device (and possibly also from frames generated by other capturing devices) can utilize the markers and the marker detection methods disclosed below.

Figure 2:
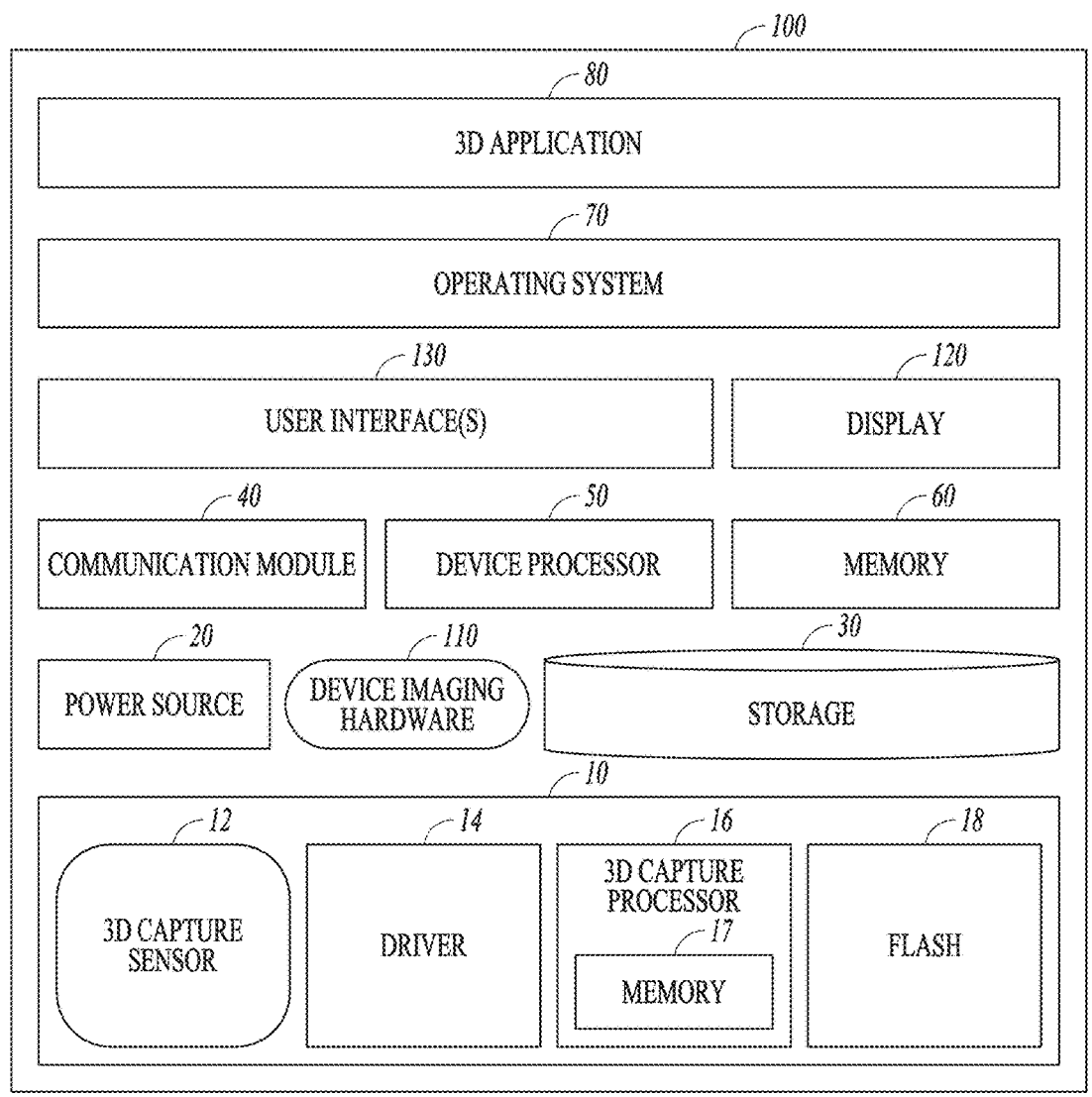
FIG. 2 is a block diagram of a 3D system architecture according to an example of the present disclosed subject matter.

Reference is now made to FIG. 2, which is a simplified block diagram of a mobile communication device system architecture of 3D capture device 102, according to one example of the presently disclosed subject matter. As can be seen in FIG. 2, and by way of example, mobile communication device 100 can include a 3D camera 10 that is capable of providing 3D depth or range data. In the example of FIG. 2 there is shown a configuration of an active stereo 3D camera, but in further examples of the presently disclosed subject matter other known 3D capture technologies and 3D cameras or scanners can be used. Those versed in the art can readily apply the teachings provided in the examples of the presently disclosed subject matter to other 3D camera configurations and to other 3D capture technologies.

By way of example, the 3D camera 10 can include: a 3D capture sensor 12, a driver 14, a 3D capture processor 16 and a flash module 18. In this example, the flash module 18 is configured to project a structured light pattern and the 3D capture sensor 12 is configured to capture an image of a reflection of the projected pattern, as reflected from the environment onto which the pattern was projected. U.S. Pat. No. 8,090,194 to Gordon et. al. and U.S. Pat. No. 8,538,166 to Gordon et al. describe an example of a structured light pattern that can be used in a flash component of a 3D capture device, as well as other aspects of active stereo 3D capture technology and is hereby incorporated into the present application in its entirety. International Application Publication No. WO2013/144952 describes an example of a possible flash (projector) design and is hereby incorporated by reference in its entirety.

By way of example, the flash module 18 can include an IR light source, such that it is capable of projecting IR radiation, and the 3D capture sensor 12 can be and IR sensor, that is sensitive to radiation in the IR band, and such that it is capable of capturing the IR radiation that is returned from the scene. The flash module 18 and the 3D capture sensor 12 are calibrated. According to examples of the presently disclosed subject matter, the driver 14, the 3D capture processor 16 or any other suitable component of the mobile communication device 100 can be configured to implement self-calibration, field-calibration or auto-calibration for maintaining the calibration among the flash module 18 and the 3D capture sensor 12.

The 3D capture processor 16 can be configured to perform various processing functions, and to run computer program code which is related to the operation of one or more components of the 3D camera. The 3D capture processor 16 can include memory 17 which is capable of storing the computer program instructions that are executed or which are to be executed by the processor 16.

The driver 14 can be configured to implement a computer program which operates or controls certain functions, features or operations that the components of the 3D camera 10 are capable of carrying out.

According to examples of the presently disclosed subject matter, the mobile communication device 100 can also include hardware components in addition to the 3D camera 10, including for example, a power source 20, storage 30, a communication module 40, a device processor 40 and memory 60 device imaging hardware 110 a display unit 120 and other user interfaces 130. It should be noted that in some examples of the presently disclosed subject matter, one or more components of the mobile communication device 100 can be implemented as distributed components. In such examples, a certain component can include two or more units distributed across two or more interconnected nodes. Further by way of example, a computer program, possibly executed by the device processor 40, can be capable of controlling the distributed component and can be capable of operating the resources on each of the two or more interconnected nodes.

It is known to use various types of power sources in a mobile communication device. The power source 20 can include one or more power source units, such as a battery, a short-term high current source (such as a capacitor), a trickle-charger, etc.

The device processor 50 can include one or more processing modules which are capable of processing software programs. The processing modules can each have one or more processors. In this description, the device processor 50 may be different types of processors which are implemented in the mobile communication device 100, such as a main processor, an application processor, etc.). The device processor 50 or any of the processors which are generally referred to herein as being included in the device processor can have one or more cores, internal memory or a cache unit.

The storage unit 30 can be configured to store computer program code that is necessary for carrying out the operations or functions of the mobile communication device 100 and any of its components. The storage unit 30 can also be configured to store one or more applications, including 3D applications 80, which can be executed on the mobile communication device 100. In a distributed configuration one or more 3D applications 80 can be stored on a remote computerized device, and can be consumed by the mobile communication device 100 as a service. In addition or as an alternative to application program code, the storage unit 30 can be configured to store data, including for example 3D data that is provided by the 3D camera 10.

The communication module 40 can be configured to enable data communication to and from the mobile communication device. By way of example, communication protocols which can be supported by the communication module 40 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc.

It should be noted that according to some examples of the presently disclosed subject matter, some of the components of the 3D camera 10 can be implemented on the mobile communication hardware resources. For example, instead of having a dedicated 3D capture processor 16, the device processor 50 can be used. Still further by way of example, the mobile communication device 100 can include more than one processor and more than one type of processor, e.g., one or more digital signal processors (DSP), one or more graphical processing units (GPU), etc., and the 3D camera can be configured to use a specific one (or a specific set or type) processor(s) from the plurality of device 100 processors.

The mobile communication device 100 can be configured to run an operating system 70. Examples of mobile device operating systems include but are not limited to: Windows Mobile™ by Microsoft Corporation of Redmond, Wash., the Android operating system developed by Google Inc. of Mountain View, Calif., etc.

The 3D application 80 can be any application which uses 3D data. Examples of 3D applications include a virtual tape measure application, 3D video capture and viewer, a 3D snapshot capture and viewer application, a 3D modeling application, etc. It would be appreciated that different 3D applications can have different requirements and features. A 3D application 80 may be assigned to or can be associated with a 3D application group. In some examples, the device 100 can be capable of running a plurality of 3D applications 80 in parallel.

Imaging hardware 110 can include any imaging sensor, in a particular example, an imaging sensor that is capable of capturing visible light images can be used. According to examples of the presently disclosed subject matter, the imaging hardware 110 can include a sensor, typically a sensor that is sensitive at least to visible light, and possibly also a light source (such as one or more LEDs) for enabling image capture in low visible light conditions. According to examples of the presently disclosed subject matter, the device imaging hardware 110 or some components thereof can be calibrated to the 3D camera 10, and in particular to the 3D capture sensor 12 and to the flash 18. It would be appreciated that such a calibration can enable texturing, and in particular color texturing, of the 3D image and various other co-processing operations as will be known to those versed in the art.

In yet another example, the imaging hardware 110 can include a RGB-IR sensor that is used for capturing visible light images and for capturing IR images. Still further by way of example, the RGB-IR sensor can serve as the 3D capture sensor 12 and as the visible light camera. In this configuration, the driver 14 and the flash 18 of the 3D camera, and possibly other components of the device 100, are configured to operate in cooperation with the imaging hardware 110, and in the example given above, with the RGB-IR sensor, to provide the 3D depth or range data.

The display unit 120 can be configured to provide images and graphical data, including a visual rendering of 3D data that was captured by the 3D camera 10, possibly after being processed using the 3D application 80. The user interfaces 130 can include various components which enable the user to interact with the mobile communication device 100, such as speakers, buttons, microphones, accelerometers, gyroscopic sensors, etc. The display unit 120 can be a touch sensitive display which also serves as a user interface.

The 3D capture processor 16 or the device processor 50 or any sub-components or CPU cores, etc. of such processing entities can be configured to process a signal that is received from the 3D capture sensor 12 or from the device imaging hardware 110, in case the device imaging hardware 110 is capable of and is configured to serve the 3D camera 10. For convenience, in the following description, the core 3D capture functions shall be attributed, in a non-limiting manner, to the 3D capture processor 16. However, it would be appreciated that the functionality and task allocation between the various components and sub components of the mobile communication device 100 are often a design choice.

According to examples of the presently disclosed subject matter, the 3D capture processor 16 can be configured to collect imaging data, process the imaging data, analyze the imaging data, produce imaging results, imaging content, and/or imaging display, etc.

According to examples of the presently disclosed subject matter, the 3D capture processor 16 can receive as input an IR image and calibration information. By way of example, the calibration information may relate to an IR sensor (as an example of a 3D capture sensor) and a projector (such as the flash 18 component). In some examples of the presently disclosed subject matter, the 3D capture processor 16 can also receive as input a color image, e.g., from the device imaging hardware 110, and calibration information relating to geometric relationship between the sensors of the color camera and the IR camera.

By way of example, the processing that is carried out by the 3D capture processor 16 can include pre-processing, feature identification, error correction and triangulation. The pre-processing function can include operations for removing sensor noise and for improving signal quality, e.g., by resolving optical issues, such as speckles. The feature identification function translates areas in the image to one of a plurality of code words that were used in the pattern that was projected by the flash 18 and which was captured by the 3D capture sensor 12. The error correction operation can include computations which use pre-existing knowledge of the projected pattern/code to correct erroneous labeling of code words or of features of code words (which can lead to changing of a label of one or more code words). The triangulation function takes into account the imaging geometry to extract the depth information. An example of a triangulation procedure that is made with reference to active triangulation methods is provided in U.S. Pat. No. 8,090,194 to Gordon et. al.

According to examples of the presently disclosed subject matter, the 3D capture processor 16 can also perform texturing such as color texturing (sometimes referred to as "color projection"), whereby the color from a color sensor (e.g., from the device imaging hardware 110) is projected onto the 3D data. It would be appreciated that the color projection function (as any other function described here with reference to the 3D capture processor 16) can be carried out by the device processor 50 or any processing component thereof.

Additional processes which may involve processing operations and which can be implemented as part of a 3D data processing pipeline for certain 3D applications can (but not necessarily) include some (e.g., one, two, three, . . . ) of the following: live system control (e.g., auto gain, auto exposure, control of active source power and pulse duration, etc.), point cloud registration, denoising, feature classification, feature tracking, various 3D vision uses, passive camera processing (e.g., pose estimations, shape from motion etc.), inertial measurement unit (IMU) processing (e.g, kalman filters), time stamping, ISP functions (demosaic, gamma correction), compression, calibration quality monitoring (a process that is used to evaluate and track the quality of the calibration parameters, for example, in order to determine if and when re-calibration is needed), etc. It would be appreciated that the above operations can be carried out on the 3D capture processor 16, on the device processor 50 or on both (the processing tasks can be divided among the various processing resource, either in advance or in real-time).

According to examples of the presently disclosed subject matter, the 3D camera 10, after processing of the signal from the sensor 12 and possibly from other sources, can be configured to provide as output one or more of the following: a set of 3D points, typically with normals (point cloud), where the normals can be computed using adjacent points; a textured triangulated mesh (e.g. a polygonal surface), where the polygons can be computed using adjacent points from a point cloud; depth map with color map (such as by color projection). Those versed in the art would appreciate that additional outputs can be provided by the 3D camera 10. As mentioned above, some of the processing attributed in some examples of the presently disclosed subject matter to the 3D camera 10 and to the 3D capture processor 16 can be carried out outside the 3D camera 10, and in particular by the device processor 50, and so some of the output which are attributed here to the 3D camera 10 can be generated outside what is referred to as the 3D camera in the examples shown in FIG. 2 and in the description of FIG. 2 provided herein.

According to examples of the presently disclosed subject matter, the device processor 50, possibly in cooperation with the 3D capture processor 16, can be configured to determine or receive data with respect to the state of the resources of the mobile communication system 100. The resources state data can be organized in any suitable form. For example, related or alternative resources can be grouped, resources which are linked by some tradeoff can be linked, resources whose usage crossed some threshold can be grouped, etc.

According to examples of the presently disclosed subject matter, in addition to the usage state information, the device processor 50 can be configured to obtain or receive, e.g., from the memory 60, additional information which can be useful to determine the usage state of one or more resources of the mobile communication device 100. For example, the device processor 50 can obtain data which relates to expected resources usage, for example, as result of scheduled tasks or based on statistics with respect to the device 100 or its resources behavior in terms of resource usage and/or based on statistics with respect to the behavior of applications running on the device in terms of resource usage. In another example, expected resources usage can relate to tasks that are expected to be carried out, either as a result of processes that are already running one the mobile communication device, or for any other reason.

According to examples of the presently disclosed subject matter, the term "resource availability profile" is used in the description and in the claims to describe the data that is used in the mobile communication device to describe the current or expected state of one or more resources of the mobile communication device, in particular to describe the state of the resources that are associated with the operation of a 3D application, or which are expected to be effected by the operation of a 3D application or any of its features.

According to examples of the presently disclosed subject matter, the device processor 50 can be configured to continuously monitor the state of the resources of the mobile communication device 100 and can update to the resource availability profile accordingly. In further examples of the presently disclosed subject matter the device processor 50 can be configured to routinely monitor the resources state and update the resource availability profile, where the timing of the update is either determined according to predefined intervals, or is determined based on some input that is received at the device processor. In yet another example, the device processor 50 updates the resource availability profile when a certain event occurs, such as when an event affects the availability of at least one resource of the mobile communication device, the device processor can update the resource availability profile.

Throughout the description and in the claims reference is made to the term "3D application". The term 3D application as used herein relates to a computer program code that can run as an application on a mobile communication platform (whether hosted locally or whether hosted remotely and consumed as a service on a mobile communication device), and which computer program code embodies at least one feature which uses 3D data, in particular 3D data that is provided by or obtained from a 3D camera. Such a feature is termed in the description and in the claims as a 3D capture feature. Many examples of 3D applications exist in the market and the following are a small sample of which: virtual tape measure, room modeling, 3D segmentation, 3D model creation, augmented reality, interactive computer games, 3D medical imaging, 3D model based video conferencing, digital puppetry and skeletal animation, etc.

It would be appreciated that a 3D application, or a 3D capture feature of a 3D application can have certain attributes characteristics and requirements. Furthermore, in order to enable, support and/or execute different 3D capture features, different resources (hardware resource but possibly also software resources) allocation requirements can exist (including different levels of a given resource), or from another perspective, or according to different implementations, different 3D capture features can consume different resources (including different levels of a given resource).

For example, assume a 3D conferencing application having a full-view feature and a face-only feature, where the full scene feature involves capturing and processing 3D data from the entire field of view of the sensor, and the face-only feature involves utilizing only the resources that are required for obtaining 3D data of an area in the scene where the face of a person facing the 3D capture sensor is detected. Among the two features, it is highly probable that the full view feature of the 3D capture application will consume greater processing, memory and power resources compared to the face only feature.

According to examples of the presently disclosed subject matter, a given feature of a given 3D application 80 can be associated with a particular part of the software program code of the 3D application. Alternatively or additionally, a feature of a 3D application 80 can be associated with a particular resource, such as a particular hardware component or a particular software program code external to 3D application 80 and running on the mobile communication device 100. For example, a feature of a 3D application can be associated with an inertial measurement unit (not shown) of the mobile communication device 100.

According to examples of the presently disclosed subject matter, for each feature there can be provided a cost measure. The term "cost measure" as used herein and in the claims relates to a measure of a feature's estimated, expected or measured consumption of a given resource or of a resource group, or of one resource from a resource group, or the measure can be global measure of the feature's resource consumption. In yet further example, the cost measure can relate to the feature's estimated, expected or measured consumption of a resource or resources at a given mode of the respective 3D capture application.

By way of example, the cost measure of each feature can include a plurality of measures for a plurality of resources. Still further by way of example, the cost measure can include measures for alternative resources, and such measures and the resources with which they are associated can be indicated as alternatives. It would be noted that providing such alternative measures can enable performing various tradeoff computations including with respect to different configurations of a given feature, and in another example, with respect to implementation of different features in different 3D applications or in different operational mode of a given (the same) 3D application.

Furthermore, it is possible that two or more 3D applications which are functionally connected to one another would be executed in the mobile communication device 100, and the relation between the 3D applications can be indicated, and the device processor 50 can be configured to take into account the relations and cross effect of the related 3D applications of some features thereof when processing a cost measure of a given feature of one of the related 3D applications.

By way of example the cost measure of a given 3D application feature can be provided as explicit data that is stored as part of the feature program code, or that is otherwise associated with the feature program code. In a further example, the cost measure of a given 3D application feature can be determined (e.g., calculated) based on previous behavior of the feature and of one or more resources which are utilized to enable the feature. In yet further examples, the cost measure of a given 3D application feature can be determined based on statistical data, for example, based on the resource consumption of related features, possibly of related 3D applications, and possibly also under similar operating conditions, on similar mobile communication devices, etc.

The cost measure can be provided in various forms. For example, the cost measure can include information related to an amount or level of power (electricity) consumption, capacity consumption (e.g. consumption of processing power, consumption of memory, consumption of communication bandwidth, etc.). In another example, the cost measure can provide a measure of an aspect of user experience such as increased or reduced latency, frame rate, accuracy of output, etc.

According to examples of the presently disclosed subject matter, in addition to the cost measure of a given feature of a 3D capture application, a functional measure can be obtained with respect to the feature. The term "functional measure" as used herein relates to an indication provided in respect of the functional value of a 3D capture application feature in respect of which the functional measure is provided. By way of example, the functional value of a feature indicates the value, importance or contribution of the feature to the user experience. In another example, the functional value of a feature indicates the value, importance or contribution of the feature for enabling additional features of the 3D capture application, or the value, importance or contribution of the feature for enabling features of other applications.

Still further by way of example the functional measure of a given feature can relate to a specific mode of operation of the respective 3D capture application, and the functional measure relates to the functional value of the respective feature in the respective mode of the 3D capture application.

According to examples of the presently disclosed subject matter, each 3D application can have at least one mode of operation. According to examples of the presently disclosed subject matter, a 3D application can include a live-mode. The term "live-mode of a 3D capture application" (or "live-mode" in short) as used in the description and in the claims relates to a mode of the 3D application in which instant (real time or near real time, e.g., up to 1 second of latency) feedback is provided (e.g., presented on a display) to a user (human or program) of the 3D application. Still further by way of example, the feedback provided in the live mode of the 3D application, possibly together with additional features of the live mode, can facilitate a certain measure of control over the an ongoing capturing process of 3D data. For example, instant feedback which is provided by the mobile communication device in the live mode of a 3D application can enable modification of one or more configurations and/or features or usage of at least one resource of the mobile communication device that can modify the results of the ongoing 3D capture process. Examples of modification which can be enabled by the live mode include changing an orientation of the 3D imaging components, modifying a level of illumination provided by the projector, changing the type of pattern that is used by the projector, and control over software resources of the mobile communication device, such as modifying a level of gain applied to the incoming signal from the sensor, changing the type of error correction used in the decoding process, etc.

According to examples of the presently disclosed subject matter, a resource of the mobile communication device, as used herein can relate to a component or a sub-component, a firmware routine, or a software program running of the mobile communication device.

As would be appreciated by those versed in the art, in case a 3D application also operates at a non-live mode, the hardware and/or software configuration that is used in the 3D capture live-mode can have effect on operation of the non-live mode of the 3D application, and can have an effect on the resources that are used in the non-live mode of the 3D application, including the level of usage, etc. In another example, the stream of data that is passed on a non-live mode of the 3D capture, e.g., for further processing can also be influenced by the actual implementation of the live-mode of the respective 3D application.

In the present disclosure and in the claims, the term "non-live mode of a 3D application" (or "non-live mode" in short) (e.g., latency is above 1 second or above 2-3 seconds), relates to a mode of operation of a 3D application, other than a live mode. According to examples of the presently disclosed subject matter, a non-live mode of a 3D application is a mode which does not take place concurrently with the 3D capture operation. Still by way of example, a non-live mode of a 3D application usually involves further utilization of resources, including, for example, further processing of the 3D data. Still further by way of example, the non-live mode can include further processing by the device processor 50 of the mobile communication device 100 or in another example, further processing by external (and remote) resources.

It would be appreciated that in addition to the live-mode of a given 3D application several non-live modes can exist, each of which can have different features, or features that have different configurations. By way of example, the modes can differ from one another in the amount of latency, as well as in other characteristics.

According to examples of the presently disclosed subject matter, a given mode of a 3D application can include at least two features, where the two features are alternative to one another, and wherein in the given mode of the application it is possible to use only one of the two features. Further by way of example, each one of the two alternative features can have a different resource consumption.

According to examples of the presently disclosed subject matter, two different modes of a certain 3D application can have one or more common 3D application features. Further by way of example, a given feature of a 3D application can have a different configuration or different characteristics in different modes of a given 3D application. It would be noted, a feature can have different resource consumption characteristics in different configurations or modes. In case a 3D application that is subject to the resource management procedure according to examples of the presently disclosed subject matter, has identical sets of features across two modes of operation which are used in the resource management procedure, at least one of the features can have a different configuration in each of the two modes of operation.

In other examples, two different modes of a certain 3D application can have entirely different features (none of the features is common).

According to a further aspect of the presently disclosed subject matter, a 3D application or given features of a 3D application can have a local mode and a remote mode. According to examples of the presently disclosed subject matter, in the local mode of a given feature most, including all, of the resources which are consumed by the feature of the 3D application reside locally or are mostly local features of the mobile communication device, and in the remote mode of the feature most, including all, of the resources which are consumed by the feature are local on a remote node (are external to the mobile communication device), e.g., most of the resources are in the cloud.

In one example, the 3D capture processor 16 or the device processor 50 can be configured to determine which feature of a 3D application 80 to use in a given mode of the application, or whether to use a feature of a first mode of the 3D application or a feature of a second mode of the 3D application based on resource availability information relating to an availability or to a state of one or more resource of the mobile communication device, such as battery power, processing power, memory resources, communication bandwidth, availability of remote processing, etc. Still further by way of example the decision regarding which feature to use in particular mode can be further based on one or more hardware cost parameters which are associated with the feature.

Figure 3:
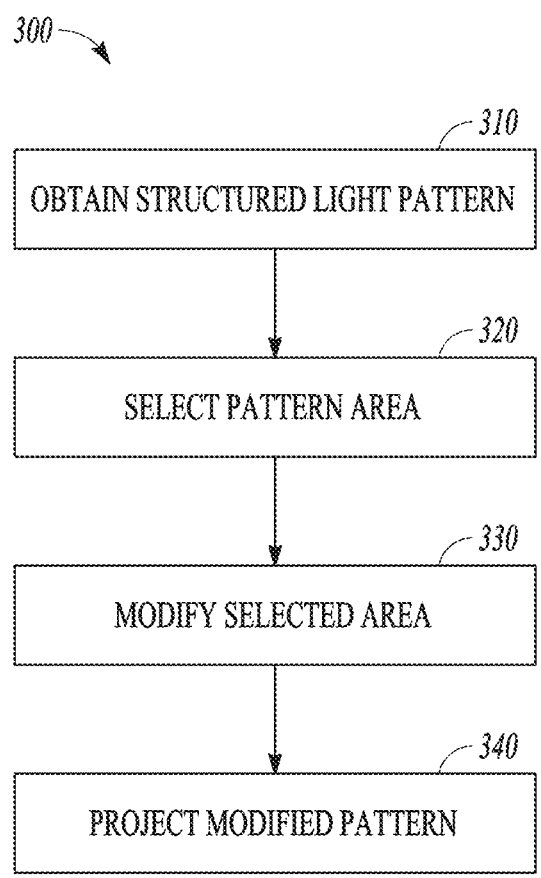
FIG. 3 is a flowchart illustrating generally a method of generating a bi-dimensional coded pattern for an optical mask, according to an example of the present disclosed subject matter.

FIG. 3 illustrates a method 300 of generating a bi-dimensional coded pattern for an optical mask, according to examples of the presently disclosed subject matter. The method in FIG. 3 specifically relates to a method of generating a bi-dimensional coded pattern with markers incorporated therein. Various aspects of such a method are described below. By way of example, bi-dimensional coded pattern can be imprinted on the optical mask, such that when the mask is illuminated, some of the light is transmitted and some is blocked resulting in a bi-dimensional structured light pattern. The bi-dimensional structured light pattern can be projected onto a scene, and using an image sensor (e.g., IR or NIR sensor) an image of the scene with the projected bi-dimensional structured light pattern can be obtained. The image of the projected bi-dimensional structured light pattern can be process, and the code can be decoded, resulting in a set of depth measurements for different points in the scene.

By way of example, a sensing and imaging system such as that demonstrated in FIG. 2 makes use of a bi-dimensional coded pattern that is generated in accordance with FIG. 3 and the description thereof provided herein, but other 3D imaging systems can use this method of generating bi-dimensional coded pattern and/or the pattern which it produces.

For example, a bi-dimensional coded pattern and the markers incorporated in the pattern which are generated in accordance with FIG. 3 can be used to assist in calibration of a 3D system, in generation of 3D or range data and during or before processing an image captured by a 3D system. It would be however also appreciated that in further examples of the presently disclosed subject matter, the method described with reference to FIG. 3 can be carried out by any other suitable system or device utilizing any hardware components possibly in combination with suitable software that is implemented by some of the system's hardware components.

At box 310, the method may obtain a bi-dimensional coded pattern. The pattern can include a plurality of distinct feature types that can be identified by a computer or algorithm. Each feature type can serve as a distinct Codeword.

Each feature type is characterized by a unique formation of feature elements. Feature elements are characterized by local light intensity distributions. Feature elements can include for example, minima, maxima, or saddle points. Feature types can also be characterized by shapes, corners, edges, junctions, etc. The feature types can be arranged in various formations including coding matrices of any size or dimension such as 8×2 and 8×4 and in non-Cartesian arrangements. The pattern may include a fundamental tiling unit which is repeated. Examples of feature elements, feature types and bi-dimensional coded patterns are provided in U.S. Pat. No. 8,090,194 to Gordon et. al.

In one example, the pattern may be extracted from a local or remote memory. The pattern may be loaded as an image. Similarly, the pattern may be loaded as a tile and a pattern thereafter generated from repeating the tile in any manner listed above.

Figure 4B:
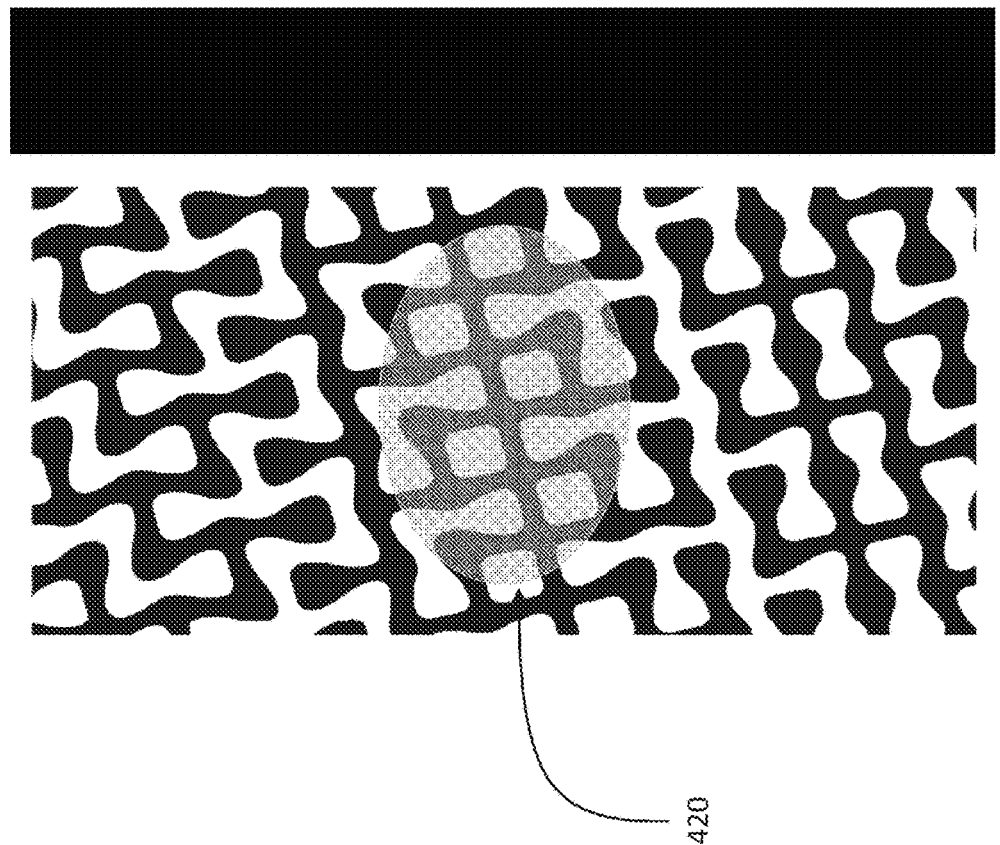
FIGS. 4A-4B are graphic representations of example selections, according to examples of the present disclosed subject matter.
Figure 4A:
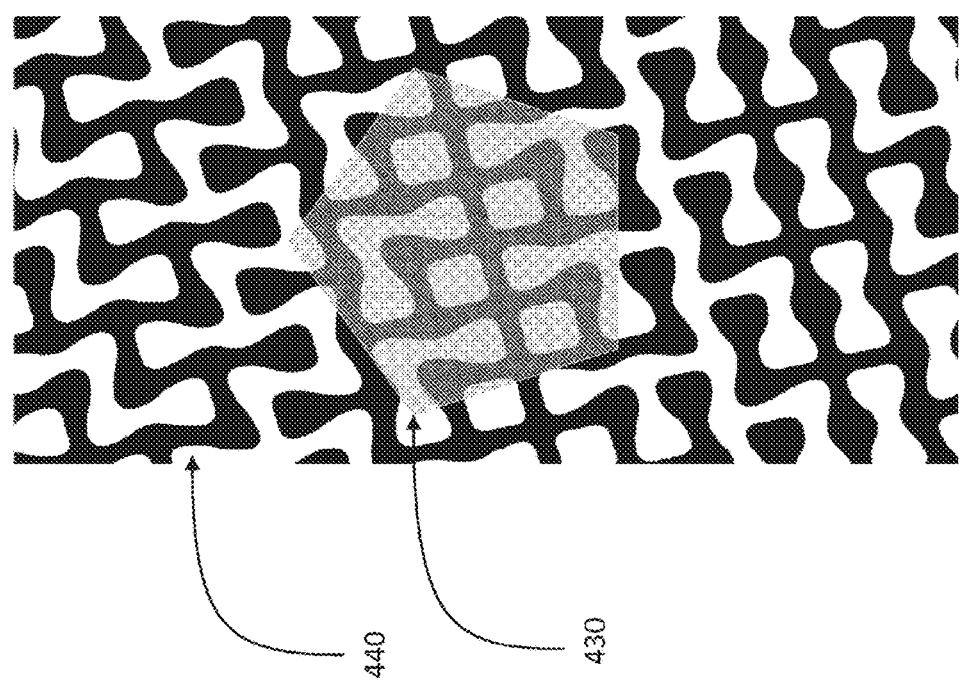

At box 320, the method may optionally select a pattern area. FIG. 4A-4B illustrate example area selections for marker generation according to an example of the presently disclosed subject matter. According to examples of the presently disclosed subject matter, a distortion area can be defined by closed boundaries. FIG. 4A illustrates a polygonal based selection 430 for modifying an area of the pattern 440 that is to serve as a marker. FIG. 4B illustrates an elliptical based distortion area selection 420 for modifying the pattern. The selection patterns are examples, and any closed shape may be used. The distortion area can be chosen so that a certain segment of the pattern is modified, while preserving the area outside the selection unchanged.

It would be noted that the markers are not necessarily added to an existing pattern, and that in further examples, the pattern can be created with the markers incorporated into the pattern. In this regard, the process of selecting the distortion areas and determining the shape and other characteristics of the marker can be implemented as part of the design and/or the manufacturing of the bi-dimensional coded pattern.

A plurality of markers can be created and incorporated in any given pattern. In this case, distortion areas (which are the areas of the pattern where the markers will be placed) may be chosen one at a time and individually modified, or multiple areas chosen and the markers can be created simultaneously. The areas of the pattern where the markers are placed may be selected according to a predefined scheme or in a random or pseudorandom fashion.

In one example, distortion area selection can be managed in order to limit pattern distortion or in order to have the pattern modified in select areas. The markers areas can be selected so that detection of the markers (and distinguishing them from non-marker feature types) and/or decoding of the modified feature types (that serve as markers) is more robust and/or efficient.

According to examples of the presently disclosed subject matter, the distortion area can be of a fixed shape such as, for example, an ellipse, a circle, a square, a pentagon or a star. The distortion area shape can also be an arbitrary or drawn shape, such as when the area is selected by a user by hand According to one example of the presently disclosed subject matter, the shape and/or dimensions of the distortion area can be selected taking into account one or more characteristics of the pattern or of one or more features of the pattern.

At box 330 a marker's area may be modified, and the marker can thus be incorporated into the pattern. In one example, the modification of the area of the pattern that is transformed into a marker may be done according to a modification rule. The modification rule can be based on a marker detection criterion and on a feature type detection criterion.

It would be noted that the marker detection criterion, the feature type identification criterion or both can depend on several factors, including for example, a tolerance of the decoder, optical properties of the imaged scene, properties of the projected pattern, properties of the projection and/or imaging equipment, etc. The configuration of the distortion area modification criterion, and the generation of marker and their appearance can be associated with some or all of these factors, as well as any with other relevant factors. Various configurations can be devised for the modification rule, and the selection of a particular configuration can be a matter of design choice. Additional factors which can influence the marker detectability and/or feature type's identification can also include: compression capabilities, decoding time, overall effect on detection algorithm performance. Other examples of factors which may influence in the detection and identification processes mentioned above, and which may be factored into the detectability and identification criteria may further include preservation of value and/or order of the code in the structured light pattern, preservation of grid connectivity and ability to perform automatic calibration.

According to examples of the presently disclosed subject matter, a detectability criterion is associated with a marker detection procedure, and relates to the ability of the marker detection procedure to correctly detect a modification in the area of interest, and to interpret such detected modification as being a marker. It would be noted that in case the locations where the markers are embedded in the pattern are known in advance, the marker detection procedure can be configured to focus or to limit the search to expected locations of the markers and possibly to some extended area in the vicinity or around the expected location of the markers. It would be noted that the marker detection algorithm can include a marker detection threshold or range which allows some tolerance with respect to the expected modification that is expected for a marker. It would be noted that the marker detection algorithm, and the marker detection threshold or range, can express some balance or tradeoff between successful identification of markers in the projected pattern, and false positives.

According to examples of the presently disclosed subject matter, a marker detection criterion can be associated with features, characteristics or configurations of a decoder that is used for decoding an image including the projected pattern (and the embedded markers). As mentioned above, each the feature types in the pattern correspond to code word. The decoding procedure assigns code word values to areas in the projected code which were identified as representing respective projected feature types. The feature type identification criteria control the modification of the feature type that is modified to create the marker, such that the change would not render the marker as non-decodable or such that the change would not cause the decoder to err in classifying the marker. In other words, the feature type identification criteria can be used in the creation of the marker to assure, or to increase the likelihood, that a respective decoder when used to decode the pattern incorporating the marker will assign to each (or to a majority, or to a minimum number, etc.) of the markers in the pattern the code word value of the original feature type from which the marker was created.

In one example of the presently disclosed subject matter, how accurately a pattern may be captured is used as criteria for modifying the pattern and creating the markers.

In one example of the presently disclosed subject matter, grid connectivity preservation is used in part as criteria for modifying distortion areas. For example, the modification rule can be configured so as to limit an extent of allowed change at certain regions within the distortion area. Still further by way of example, the regions within the distortion areas where the extent of change is limited include the areas' boundaries. Still further by way of example, the regions within the distortion areas where the extent of change is limited include the center of the areas.

In one example of the presently disclosed subject matter, ability to perform calibration is used in part as criteria for modifying a distortion area. Markers can assist with calibration of the 3D imaging equipment, and may increase calibration strength. If distortion areas are modified in a certain way, then a marker identification procedure can be implemented to reliably identify markers for calibration. These modified areas of interest can be recognized, for example, due to their pre-defined distorted natures. They may then be used as reference points for overall alignment and orientation of the pattern. For example, the locations of the markers can be relatively easily compared across multiple (two, tree, etc.) frames which at least partially overlap.

Another feature type identification criteria example may be associated with image capture during dynamic scenes, or when temporal encoding is used. When a video of 3D data is being acquired, different encoding or marking schemes can be used for different frames, and/or frames at different times may be captured or decoded in different ways (e.g., to save data and processing time). One projection scheme may include utilizing modified areas or markers intermittently or only in select frames. In another example, when sequential frames are encoded, the method may code one frame at full resolution and each other frame with a subset of the data.

Under certain conditions, having modified markers in all frames could slow down decoding, and therefore the markers are used in only a subset of the frames, e.g., every 2 or 5 or 10 frames. Similarly, applying feature type identification and decodability criteria and having modified markers in the pattern may increase the speed or accuracy of decoding and could increases frame resolution, modified markers can be used in all frames. In yet another example, feature type identification criteria may indicate that different modifications, or arrangements of modifications, over different frames is beneficial and a suitable modification scheme can be devised and used. For example, in a sequence of frames a twirl pattern may be used in even frames and a pinch or zigzag pattern may be used in odd frames.

Figure 5:
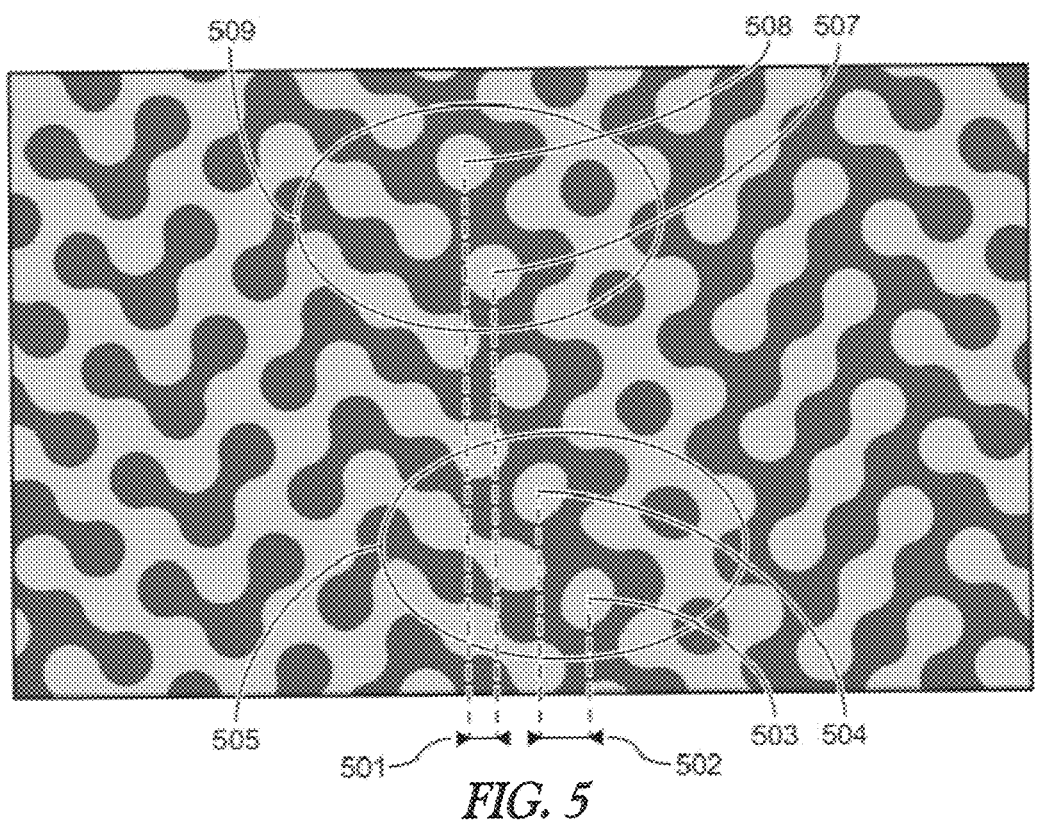
FIG. 5 is a graphic representation illustrating a bi-dimensional bi-tonal structure light pattern including marker created using a twirl type distortion, according to examples of the presently disclosed subject matter.
Figure 6:
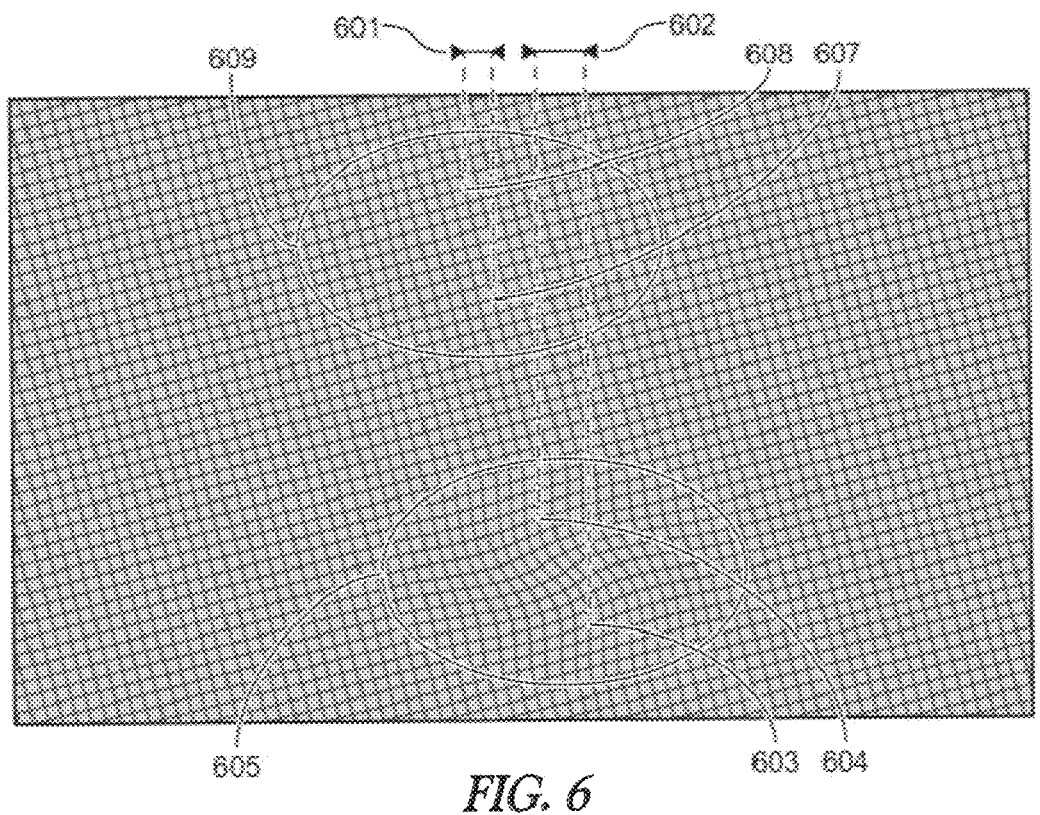
FIG. 6 is a graphic representation illustrating a grid having a distortion that is similar to the twirl type distortion applied to the pattern of FIG. 5, according to examples of the presently disclosed subject matter.

FIG. 5 illustrates a bi-dimensional bi-tonal structure light pattern including marker created using a twirl type distortion, according to examples of the presently disclosed subject matter. Additional reference is made to FIG. 6, which is a grid having a distortion that is similar to the twirl type distortion applied to the pattern of FIG. 5, according to examples of the presently disclosed subject matter. FIG. 5 shows an example of a bi-dimensional coded pattern that is comprised of a plurality of feature types, where each feature type is comprised of a unique combination of a plurality of feature elements. Each one of the feature elements that are used to construct a feature type has a predefined shape and dimensions. FIG. 6 is provided as a non-limiting visual aid which shows another view of the distortion that was applied within a distortion area 505 in FIG. 5 as compared to a non-modified area 509. The areas corresponding to the distortion area 505 and the non-modified area 509 in FIG. 5 are marked 605 and 609, respectively, in FIG. 6.

The coded pattern shown in FIG. 5 can be used to provide a structured light pattern in a 3D capture device. In such a 3D capture device, a projector is used to project the structured light pattern. The structured light pattern or some portion thereof is reflected off one or more objects, and a sensor is used to capture an image of the reflected pattern. The projector-sensor relation creates epipolar geometry. Having a fixed relative position between the projector and the sensor imparts a geometric constraint which restricts the location of any given reflected feature type (and any feature element) in the captured image to a unique epipolar line in the captured image. This geometric constraint and the structure of the pattern determines the epipolar distances between distinguishable epipolar lines. However, some examples of the presently disclosed subject matter can also be used with non-fixed projector-sensor configurations.

In FIG. 5, the bi-dimensional coded pattern is orientated at a certain angle relative to the epipolar field. Discussion of the coding method and further discussion with regard to the orientation of the code relative to the epipolar field is described for example in U.S. Pat. Nos. 8,090,194 and 8,538,166. However, it should be noted that the examples provided herein including with regard to a method of generating markers are not limited to a code that is orientated relative to the epipolar field, and can also be applied to a code that is arranged in various other forms (relative to the epipolar field), including with respect to a code that is aligned with the epipolar field, as long as the coding method provides equidistant feature elements or in a more generic implementation of examples of the presently disclosed subject matter, the method of generating markers is used with a code that has predefined distances between any given pair of feature elements.

According to examples of the presently disclosed subject matter, the markers are generated by modifying, within a certain area of the pattern, the epipolar distances between a pair (or pairs) of feature elements. The extent of modification of the epipolar distances can be determined by a preset epipolar distance modification range that is used in the marker detection process and is within a tolerance that is implemented in the decoding process. Thus, the markers can be identified as such by the marker identification process, but would not lead to incorrect classification of the feature type effected by the modification. For example, the extent of change is determined according to a certain noise level value, which represent an expected, evaluated or measured level of noise in the system, and the modification may be greater than a change caused by a noisy signal (at least to some degree or within an acceptable error rate). In this regard, some examples of the presently disclosed subject matter use a predefined distortion value which reflects an expected or estimated level of noise in a captured image of the projected pattern, and the modification is selected and/or controlled such that it exceeds, and is possibly distanced away by some margin, from the distortion value. According to examples of the presently disclosed subject matter, the predefined distortion value can be associated with (but is not necessarily bound by) the system's depth of field or with the system's SNR behavior, in particular with the system's SNR profile within the system's FOV. It should be further appreciated that some errors in identification of markers can occur due to (high levels of) local noise and other reasons, but a careful tuning of the modification that is used to create the markers and distribution of a plurality of markers within the projected pattern can reduce the implication of such errors.

It would also be noted that the change within a certain distortion area can also effect the epipolar distances between feature elements located within the distortion area and feature elements located outside the distortion area, e.g., the epipolar distances between feature elements in the distortion area and feature elements just outside the distortion area can also be modified due to the distortion applied within the distortion area. In this regard, a term marker area can extend beyond the distortion area. A marker area can include feature elements which were not distorted, since the epipolar distance between feature elements outside the distortion area and feature elements within the distortion area can also be different than the epipolar distance between respective feature elements within a non-modified area. In one example of the presently disclosed subject matter, a marker area includes the distortion area and the feature elements at the outside boundary of the distortion area. For illustration, in FIG. 5, the feature elements at the outside boundary of the distortion area includes the feature elements directly surrounding area 505.

In FIG. 5 there is shown a distortion area 505 and a non-modified area 509. Within the distortion area 505 a twirl distortion is applied. This distortion modifies the epipolar distances between some or all of the feature elements within the distortion area 505. For example, compare the original epipolar distance 501 between feature elements 507 and 508 within the non-modified area 509 and the modified epipolar distance 502 between respective feature elements 503 and 504 within the distortion area 505. A similar modification is shown in FIG. 6 between the original epipolar distance 601 between grid points 607 and 608 within the non-modified area 609 and the modified epipolar distance 602 between respective grid points 603 and 604 within the distortion area 605.

According to examples of the presently disclosed subject matter, the marker detection process is configured to detect within an image of a projected structured light pattern appearances of feature elements whose epipolar distances are different from the epipolar distances between respective feature elements in the original pattern (e.g., greater or smaller by some value or factor).

Further by way of example, the change may be such that the modified appearance of the respective feature type or feature types is within the tolerances applied by the feature type classification process (which can be implemented as part of the decoder), and thus the modified feature elements would not corrupt the feature type with which they are associated. In this regard, it would be appreciated that the decoding process involves identifying feature types and placing the feature types on predefined epipolar lines. Each feature type is associated with a unique formation of feature elements, and in order to identify feature types, the image is processed to determine feature elements locations. The feature elements of original feature types (non-marker feature types) have predefined epipolar distances, and marker feature types include feature elements whose epipolar distances are different from the epipolar distances of the feature elements of original feature types. However, while the epipolar distances of the feature elements of the marker feature types are modified, continuity of feature elements is maintained, including across different feature types, both within the distortion area and between feature types within the distortion area and non-modified feature types outside the distortion area (at the distortion area's edges).

Any suitable type of distortion manipulation and pattern may be used including, for example, pinching and twirling. Other examples of possible distortion include puckering and bloating. In one example, different modifications can be implemented to different areas of the pattern, for example, based on which feature detection scheme (decoding process is used), based on the area of the pattern where the marker appears. For example, for marker areas which are associated with a first feature type or with a certain cluster of feature types a first type of distortion may be used, and for marker areas associated with a second feature type or with a second cluster of feature types a second type of distortion may be used.

Figure 7:
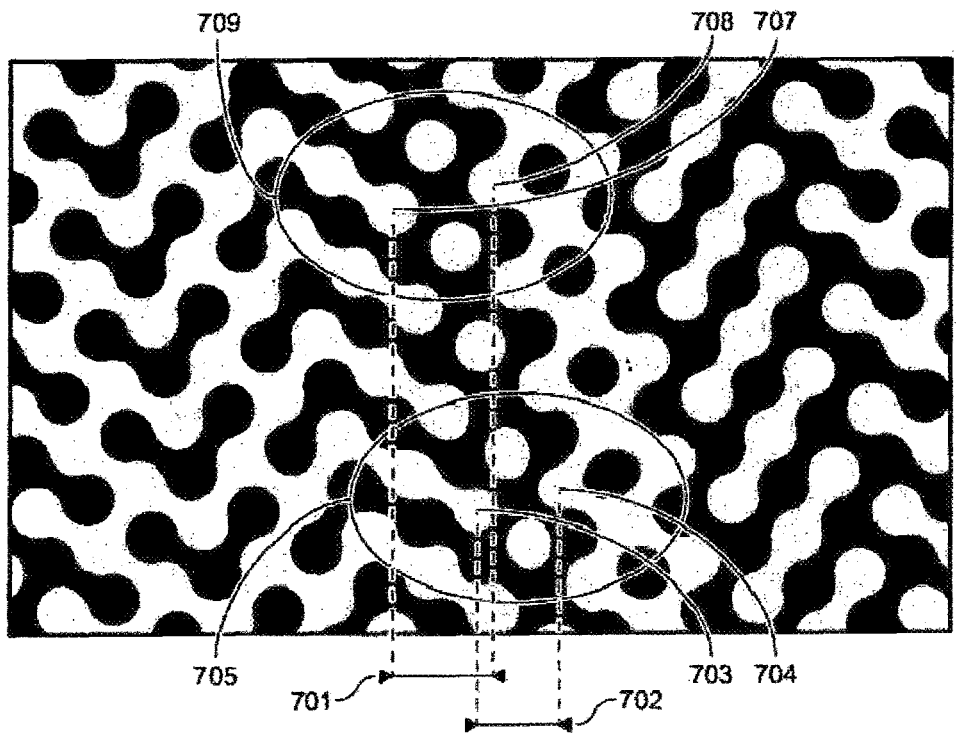
FIG. 7 illustrates a bi-dimensional bi-tonal structure light pattern including marker created using a pinch type distortion, according to examples of the presently disclosed subject matter.
Figure 8:
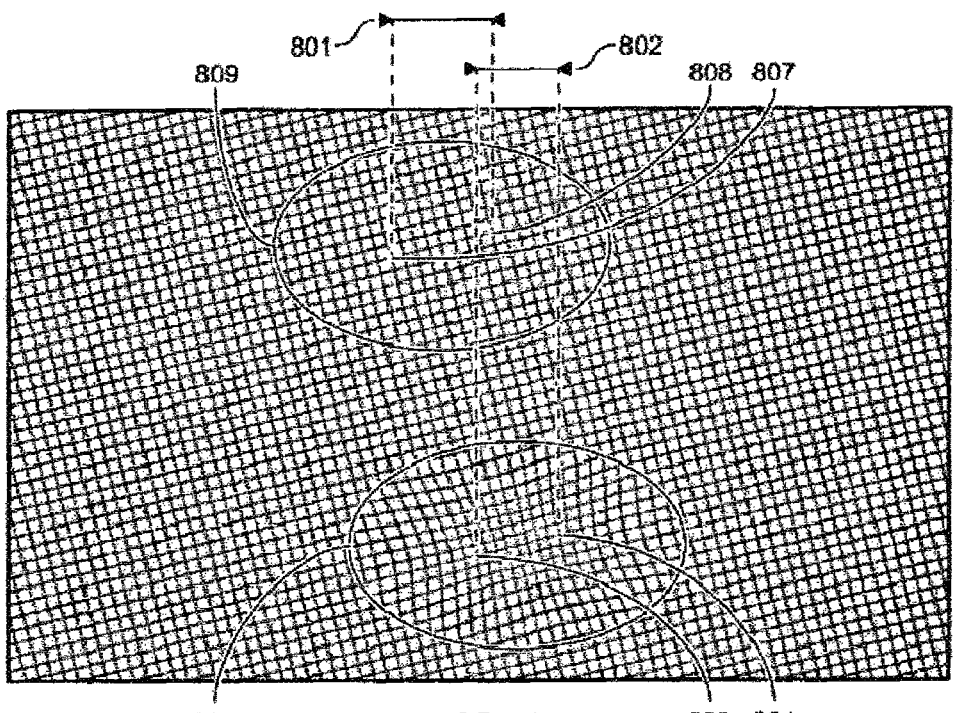
FIG. 8 is a graphic representation of a grid having a distortion that is similar to the pinch type distortion applied to the pattern of FIG. 7, according to examples of the presently disclosed subject matter.

As mentioned above, different types of distortions can be used in the marker areas. Reference is now made to FIG. 7 which illustrates a bi-dimensional bi-tonal structure light pattern including marker created using a pinch type distortion, according to examples of the presently disclosed subject matter. Additional reference is made to FIG. 8, which is a grid having a distortion that is similar to the pinch type distortion applied to the pattern of FIG. 7, according to examples of the presently disclosed subject matter. FIG. 7 shows an example of a bi-dimensional coded pattern identical to the code that was used in FIG. 5. FIG. 8 is provided as a non-limiting visual aid which shows another view of the distortion that was applied within a distortion area 705 in FIG. 7 as compared to a non-modified area 709. The areas corresponding to the distortion area 705 and the non-modified area 709 in FIG. 7 are marked 805 and 809, respectively, in FIG. 8.

In FIG. 7, within the distortion area 705 a pinch distortion is applied. This distortion modifies the epipolar distances between some or all of the feature elements within the distortion area 705. For example, compare the original epipolar distance 701 between feature elements 707 and 708 within the non-modified area 709 and the modified epipolar distance 702 between respective feature elements 703 and 704 within the distortion area 705. A similar modification is shown in FIG. 8 between the original epipolar distance 801 between grid points 807 and 808 within the non-modified area 809 and the modified epipolar distance 802 between respective grid points 803 and 804 within the distortion area 805.

It would be noted that by using markers which are decodable (or which maintain the feature types within the markers decodable), having many distortion areas in the code (the areas which are modified to create the markers) is possible with only a limited damage to or possibly even without significantly damaging the quality of depth information extractable from the projected pattern, because the markers are "transparent" to the decoding process which is capable of decoding the feature types within the marker areas. It would be appreciated that in order to maintain the decodability of the feature types within the markers the modification that is applied to the distortion areas (and to the marker areas) may be limited in its extent so as not to render the feature types within the marker areas un-decodable. For example, the modification of the epipolar distance should take into account the safe distance for epipolar line distinction, which was described for example in U.S. Pat. No. 8,090,194 to Gordon et al. and U.S. Pat. No. 8,538,166 to Gordon et al. If the epipolar distances between feature elements is modified too much, the feature types with which the feature elements are associated may no longer be identified by the decoder, or may be incorrectly placed on one of the distinguishable epipolar lines during the decoding process. On the other hand, if the modification is too small, the marker detection process is more likely to miss-identify some of the markers, since the appearance of such markers in the image of a reflection of the projected pattern can be too similar to the non-modified feature types. However, since having markers according to examples of the presently disclosed subject matter does not significantly damage the quality of depth information which is extractable from the projected pattern, many markers can be included in the pattern, and so while the marker detection process may indeed miss some of the markers, there would typically be enough markers left which would be successfully identified.

It would be appreciated that even when many markers are included in the pattern, the number of feature types is much larger. From another perspective, within the pattern, the feature types' density is much greater than the markers' density. The epipolar distance between pairs of feature types is significantly smaller than the epipolar distance between pairs of markers.

According to examples of the presently disclosed subject matter, markers can be used to support decoding and feature element and feature type extraction, including under circumstances where decoding is challenging, difficult or even impossible without use of the marker. For example, a marker detection process can be used to detect a marker, and having knowledge of the markers design, including knowledge of feature element and feature type structure (the identities of the feature types in the marker may be known), and having pre-existing knowledge of which feature elements and which feature types surround the marker, can be used to decode the projected pattern. For example, identifying the markers together with knowledge of the code layout and of features' design and structure (of feature elements and feature types) can be used to extract feature types (and possibly also feature elements) from an image of a reflection of the projected pattern including the markers.

In another example according to the presently disclosed subject matter, markers can be used to allow some level of decoding even when a 3D camera is out of calibration. Since the epipolar distances between markers are relatively large, marker ambiguity can occur only under severe circumstances of loss of calibration. By tracking markers across multiple frames, some level of calibration can be restored.

Resuming now the description of FIG. 3, at box 340 the modified pattern may be projected onto a scene. The modified pattern can be projected via flash 18, for example. The modified pattern can be projected so that the modified markers are readily detectable, for example, by a marker detection process that is applied to an image of the pattern projected onto a scene. Similarly, projection of the modified pattern can be done for use in calibration of a camera (particularly a 3D camera), automatic-calibration of a camera (particularly a 3D camera) or done in the image processing stages. Projection of the modified pattern can be done via, for example, infrared light, RGB, other forms of visible light or any other technique that is used in and for 3D imaging.

Some active triangulation or 3D data capture technologies rely upon matching detected pattern features to the projected ones using the epipolar constraint. In one example of the present disclosed subject matter, a sequence of steps to match detected features based on epipolar constraints may be: 1) detect a pattern feature type in the captured image; 2) Using a set of stereo calibration parameters, estimate the corresponding Epipolar line through the plane of the projector; 3) Find a corresponding feature type on, or closest to the line; and 4) Triangulate in order to find 3D coordinates of the feature using the calibration parameters.

For any detected feature type with camera coordinates $x_i$, the corresponding Epipolar line parameters $l_i$ may be given by:

$l_i = F x_i$ where F is the Fundamental Matrix (FM) of the stereo set. The distorted markers generated as explained above, may be detected and then matched to their projected counterparts using distribution rules (a predefined scheme according to which the markers are distributed in the pattern), allowing FM estimation by many techniques.

Figure 9:
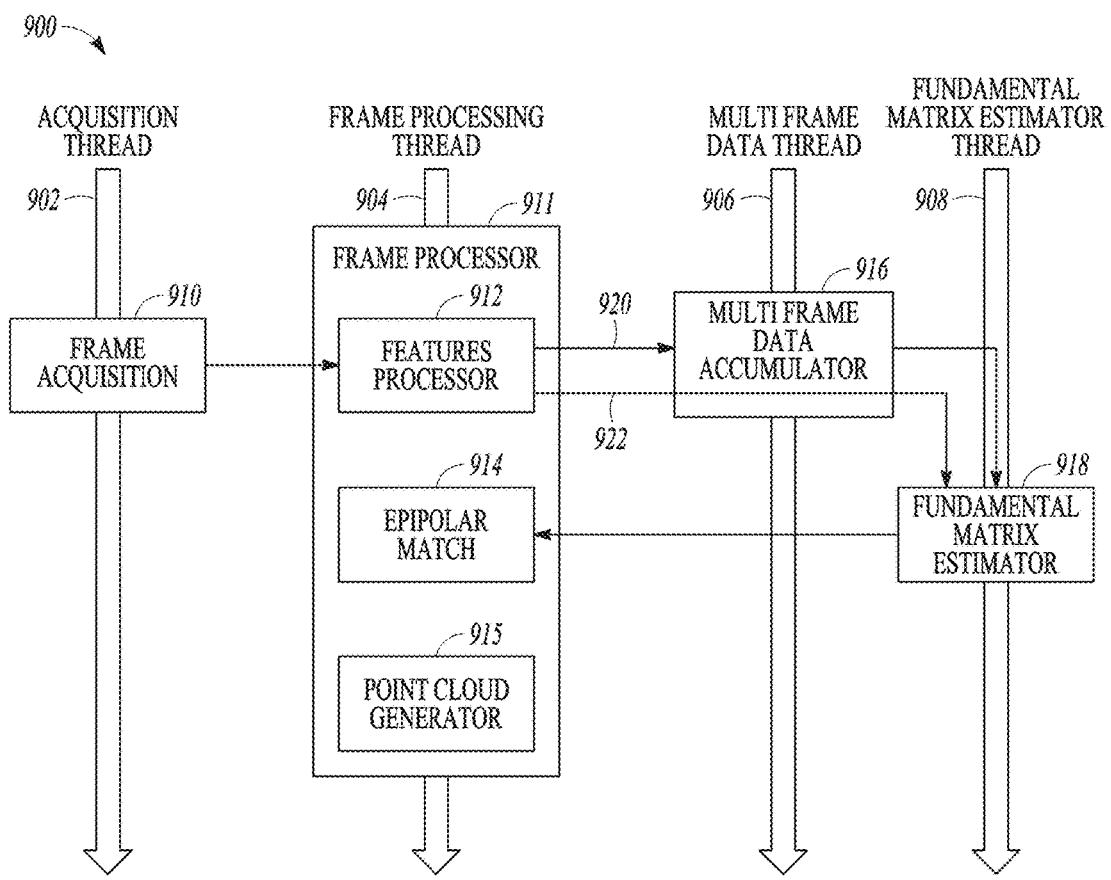
FIG. 9 is a block flow diagram illustrating an example decoder according to an example of the present disclosed subject matter.

FIG. 9 illustrates an example decoder 900 according to an example of the presently disclosed subject matter. Hardware or software decoders such as decoder 900 may be used for epipolar constraint calculations. Decoder 900 may contain, for example, several threads or processes of execution to be run separately. Threads may be run in different processing cycles. Similarly, each thread may be run as a separate integrated circuit, or a separate module on one hardware processor. Similarly device processor 50 or 3D capture processor 16 may perform decoding as done in decoder 900. In other examples, decoding may be done in a separate system such as a server or home PC.

In one example of decoder 900, acquisition thread 902, frame processing thread 904, multi-frame data thread 906 and fundamental matrix estimator thread 908 may all be run. Similarly, in another example, multi-frame data thread 906 may not be run.

In acquisition thread 902, frame acquisition engine (FAE) 910 may acquire a new frame or multiple frames from a sequence such as a video taken with a 3D capture device. In frame processing thread 904, several calculation stages may take place in frame processor 911. Features Processor 912 may identify feature types and detect markers. By way of example, marker detection and feature type identification are two distinct processors, and can be independent of one another. In one example, when epipolar matching is done on individual frames, the feature processor may bypass the Multi-frame data accumulator 916 as in path 922. In another example when epipolar matching is performed using multiple frames, features processor 912 may update the Multi-frame data accumulator 916 via path 920.

When multi-frame data thread 906 is used, the Multi-frame data accumulator (MFDA) 916 may accumulate features and epipolar data from across several frames in a sequence. In fundamental matrix estimator thread 908 the FM Estimator 918 receives an indication that a FM estimation is required. The indication may be issued by the multi frame accumulator or the features processor, which begins FM estimation. When FM estimation is done, its validity is tested and the frame processor 911 is notified to use it in next frame processing cycle.

In one example of the present disclosed subject matter, the above method may be integrated into a 3D imaging method. For example, for a received projection image, each reflected feature type is identified according feature type identification criteria (see U.S. Pat. No. 8,090,194 for examples) and its location is determined along its associated epipolar line in the image, for example by an image processing device executing 3D imaging method. The precise position of a feature along its epipolar line is then corresponded, based on triangulation, to a 3D spatial coordinate from which it was reflected. Alternatively, the position is compared to pre-computed triangulation tables to determine the three dimensional spatial location of the point on the object from which the feature is reflected. In the modified procedure, distorted markers may be detected first, during or at the end of this method and compared to marker locations in the projected pattern or in previous images of the projected pattern.

In one example of the presently disclosed subject matter, single frame fundamental matrix (FM) estimation may be performed. Performing single frame FM estimation may include acquiring a frame, detecting distorted or modified markers, building a marker correspondence, estimating a FM, updating a FM, performing epipolar matching for features in the frame and triangulating. Similarly, single frame FM estimation may include multiple iterations of the FM estimation for a plurality of sequential frames. The sequence of frame may be consecutive or can be spaced apart frames.

In one example of the present disclosed subject matter multi frame FM estimation may be performed. Detected markers may accumulate over several frames. Accumulated markers may be analyzed to eliminate false positives such as detected feature types which are not markers. The detected markers can be used to estimate a FM. In dynamic scenes, true markers may be arranged along epipolar lines, which are imaged as substantially straight lines. In static scenes, accurate markers should be located at the same or nearly the same image coordinates.

Although the preceding description sets forth a detailed description of various examples, it should be understood that the legal scope of the presently disclosed subject matter is defined by the words of the claims set forth below. The detailed description is to be construed as an example only and does not describe every possible example of the presently disclosed subject. Numerous alternative examples could be implemented, using either current technology or technology developed after the filing date of this patent, which would still fall within the scope of the claims defining the presently disclosed subject matter.

It should be understood that there exist implementations of other variations and modifications of the presently disclosed subject matter and its various aspects, as may be readily apparent to those of ordinary skill in the art, and that the presently disclosed subject matter is not limited by specific examples described herein. It is therefore contemplated to cover any and all modifications, variations or equivalents that fall within the scope of the basic underlying principals disclosed and claimed herein.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The functions or algorithms described herein may be implemented in software or a combination of software and hardware in one embodiment. The software may consist of computer executable instructions stored on computer readable media, including tangible and non-transient computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

What is claimed is:

1. A method, comprising:
    obtaining an image of a reflection off a scene of a projected structured light bi-dimensional coded light pattern that includes a plurality of feature types and a plurality of markers, each one of the plurality of feature types serves as a codeword and is formed by a unique combination of feature elements, and wherein the distances between feature elements forming the plurality of feature types are known, and wherein each one of the plurality of markers includes one or more pairs of feature elements between which the epipolar distances are different relative to distances between respective corresponding feature elements in non-marker areas of said pattern;
    detecting at least one marker from the plurality of markers in said image and recording a location of the at least one detected marker;
    decoding said image, wherein the at least one marker is classified as a feature type from said plurality of feature types and a respective codeword is assigned to the at least one marker.

2. The method according to claim 1, wherein a marker is a certain area of a pattern within which epipolar distances between one or more pairs of feature elements is modified relative to distances between respective feature elements in non-marker areas of said pattern.

3. The method according to claim 2, wherein a marker is detected when the epipolar distances between one or more pairs of feature elements in the image correspond to an epipolar distance modification value.

4. The method according to claim 3, wherein the epipolar distance modification value is associated with a signal to noise ratio profile of a 3D camera within a field of view ("FOV") of the 3D camera.

5. The method according to claim 3, wherein the epipolar distance modification value is associated with an epipolar distance between distinguishable epipolar lines in said image.

6. The method according to claim 3, wherein the epipolar distance modification value provides a range of possible distance modifications between feature elements within a marker, and where the range is associated with a signal to noise ratio profile of a 3D camera within a field of view ("FOV") of the 3D camera, and with an epipolar distance between distinguishable epipolar lines in said image.

7. The method according to claim 2, wherein a marker in said image is classified by the decoder as a feature type from said plurality of feature types and is assigned with the respective codeword value when the modified epipolar distances between the one or more pairs of feature elements in the image are within a tolerance implemented in the decoder.

8. The method according to claim 1, wherein appearance of feature elements within the marker and across the marker's edges is continuous.

9. The method according to claim 1, wherein projected pattern is orientated at an angle relative to a stereo baseline associated with a projector that was used to project the pattern and a sensor that was used to capture the image, and wherein a plurality of distinguishable epipolar lines on the sensor's plane which are associated with a spatial relation between the projector and the sensor are separated from one another by at least a minimum safe distance for epipolar line distinction.

10. The method according to claim 9, wherein an orientation angle of the pattern relative to the stereo baseline such that the distance P between distinguishable epipolar lines is less than NC, where C is the size of a feature type in a non-preferred direction of the pattern, and N is the number of feature types in the non-preferred direction of a pattern cycle.

11. The method according to claim 9, wherein the pattern is tilted, skewed or rotated relative to the stereo baseline.

12. A method of generating a structured light code, comprising:

obtaining a specification for a structured light bi-dimensional coded light pattern that includes a plurality of feature types, each one of the plurality of feature types servers as a codeword and is formed by a unique combination of feature elements, and wherein distances between feature elements forming the plurality of feature types are known;

selecting one or more distortion areas in the pattern; and modifying epipolar distances between one or more pairs of feature elements within one or more distortion areas of the pattern, each of the one or more distortion areas is associated with a plurality of markers, wherein each one of the plurality of markers includes one or more pairs of feature elements whose epipolar distances are different relative to distances between respective corresponding feature elements in non distortion areas of said pattern, thereby providing a speciation for a structured light bi dimensional coded light pattern that includes a plurality of feature types and a plurality of markers.

13. A method according to claim 12, wherein said modifying comprises modifying the epipolar distances at an extent which allows a decoder that is configured to decode an image of a reflection off a scene of the pattern to classify a modified feature type in said marker areas as a feature type from said plurality of feature types and to allow the decoder to assign the modified feature type with a codeword value of the respective feature type from said plurality of feature types.

14. The method according to claim 13, wherein said modifying comprises modifying the epipolar distances such that the modified epipolar distances between the one or more pairs of feature elements in the image are within a tolerance implemented in the decoder.

15. The method according to claim 12, wherein said modifying is associated with a signal to noise ratio profile of a 3D camera within a field of view ("FOV") of the 3D camera.

16. The method according to claim 15, wherein the 3D camera is a 3D camera that is assumed to be used for capturing an image of a reflection off a scene of a reflection the projected pattern.

17. The method according to claim 12, wherein said modifying comprises maintaining continuity of feature elements including across different feature types, both within the distortion areas and between feature elements and feature types within the distortion areas and non-modified feature elements and feature types outside the distortion areas.

18. The method according to claim 12, wherein said modifying comprises applying any one of the following modification operations: pinching, twirling, puckering or bloating.

19. The method according to claim 18, wherein different modifications are applied to different areas of the pattern.

20. The method according to claim 19, wherein an orientation angle of the pattern relative to the stereo baseline is such that the distance P between distinguishable epipolar lines is less than NC, where C is the size of a feature type in a non-preferred direction of the pattern, and N is the number of feature types in the non-preferred direction of a pattern cycle.

21. The method according to claim 12, wherein the pattern is orientated at an angle relative to a stereo baseline associated with a projector that is configured to project the pattern and a sensor that is configured for capturing an image of a reflection off a scene of the projected pattern, giving rise to a plurality of distinguishable epipolar lines separated from one another by at least a minimum safe distance for epipolar line distinction.

22. The method according to claim 20, pattern is tilted, skewed or rotated relative to the stereo baseline.

23. An apparatus comprising:

a memory storing an image of a reflection off a scene of a projected structured light bi-dimensional coded light pattern that includes a plurality of feature types and a plurality of markers, each one of the plurality of feature types serves as a codeword and is formed by a unique combination of feature elements, and wherein the distances between feature elements forming the plurality of feature types are known, and wherein each one of the plurality of markers includes one or more pairs of feature elements between which the epipolar distances are different relative to distances between respective corresponding feature elements in non-marker areas of said pattern; and a processor capable of;

detecting at least one marker from the plurality of markers in said image and recording a location of the at least one detected marker;

decoding said image, wherein the at least one marker is classified as a feature type from said plurality of feature types and a respective codeword is assigned to the at least one marker.

24. The apparatus according to claim 23, further comprising:

a projector capable of projecting said structured light bi-dimensional coded light pattern onto a scene;

a sensor capable of capturing an image of a reflection off a scene of said pattern projected onto the scene.

25. The device according to claim 24, wherein the pattern is projected at an angle relative to a stereo baseline associated with the projector and the sensor, and wherein a plurality of distinguishable epipolar lines on the sensor's plane which are associated with a spatial relation between the projector the sensor are separated from one another by at least a minimum safe distance for epipolar line distinction.

26. The apparatus according to claim 25, wherein an orientation angle of the pattern relative to the stereo baseline is such that the distance P between distinguishable epipolar lines is less than NC, where C is the size of a feature type in a non-preferred direction of the pattern, and N is the number of feature types in the non-preferred direction of a pattern cycle.

27. The apparatus according to claim 26, wherein the pattern is tilted, skewed or rotated relative to the stereo baseline.

28. A structured light projector, comprising:

an optical mask; and a light emitter, wherein the light emitter is capable of illuminating the optical mask, and the optical mask is capable of transforming the light from the emitter so as to provide structured light hi-dimensional coded light pattern that includes a plurality of feature types, each one of the plurality of feature types servers as a codeword and is formed by a unique combination of feature elements, and wherein distances between feature elements forming the plurality of feature types are known, and wherein the projected light pattern includes one or more markers, where a marker resides in a marker area of the pattern and comprises one or more pairs of feature elements between which the epipolar distances are different relative to distances between respective corresponding feature elements in non-marker areas of said pattern, and wherein appearance of feature elements within the marker and across the marker edges is continuous, thereby providing a structured light hi-dimensional coded light pattern that includes a plurality of feature types and a plurality of markers.

29. The projector according to claim 28, the epipolar distances are modified at an extent which allows a decoder that is configured to decode an image of a reflection off a scene of the pattern to classify a modified feature type in said marker areas as a feature type from said plurality of feature types and to allow the decoder to assign the modified feature type with a codeword value of the respective feature type from said plurality of feature types.

* * * * *